(12) United States Patent
Yan (10) Patent No.: US 11,916,422 B2
(45) Date of Patent: Feb. 27, 2024

(54) BATTERY CHARGE AND DISCHARGE POWER CONTROL IN A POWER GRID

(71) Applicant: GENERAL ELECTRIC COMPANY, Schenectady, NY (US)

(72) Inventor: Min Yan, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 379 days.

(21) Appl. No.: 17/419,764

(22) PCT Filed: Jan. 31, 2020

(86) PCT No.: PCT/US2020/016047
§ 371 (c)(1),
(2) Date: Jun. 30, 2021

(87) PCT Pub. No.: WO2020/160369
PCT Pub. Date: Aug. 6, 2020

(65) Prior Publication Data
US 2022/0077707 A1   Mar. 10, 2022

Related U.S. Application Data

(60) Provisional application No. 62/799,111, filed on Jan. 31, 2019.

(51) Int. Cl.
*H02J 7/00* (2006.01)
(52) U.S. Cl.
CPC .......... *H02J 7/00712* (2020.01); *H02J 7/005* (2020.01); *H02J 7/0048* (2020.01)
(58) Field of Classification Search
CPC ...... H02J 7/00712; H02J 7/0048; H02J 7/005; H02J 7/0071; H02J 3/32
(Continued)

(56) References Cited

U.S. PATENT DOCUMENTS 5,774,684 A   6/1998 Haines et al.
6,477,150 B1   11/2002 Maggenti et al.
(Continued)

FOREIGN PATENT DOCUMENTS

CN   107292488 A   10/2017
KR   1020150132407 A   11/2015
(Continued)

OTHER PUBLICATIONS

International Search Report and Written Opinion dated May 27, 2020 which was issued in a counterpart PCT Application No. PCT/US2020/016047 which was filed Jan. 31, 2020.
(Continued)

*Primary Examiner* — Paul Dinh
(74) *Attorney, Agent, or Firm* — Armstrong Teasdale LLP (57) ABSTRACT

According to some embodiments, system and method are provided comprising determining a maximum storage capacity of an energy storage system for a time window; performing a first sort of cycles by sorting in numerical order according to a ratio of a load demand to a total available power from a power generation system at each cycle of time window; assigning a unique, charge priority to each cycle; determining, starting from a highest charge priority, a charge power for each cycle until a total charge power satisfies the maximum storage capacity; determining, starting from a lowest sorted charge priority, an available discharge power for each cycle until a total discharge power exceeds the maximum storage capacity; performing a second sort in a temporal order of the cycles; determining, starting from an earliest cycle, an available state-of-charge (SOC) and adjusting the SOC of the energy storage system for each cycle.

20 Claims, 7 Drawing Sheets

(58) Field of Classification Search
USPC .......................................................... 320/134
See application file for complete search history.

(56) References Cited

U.S. PATENT DOCUMENTS

| | | |
|---|---|---|
| 7,239,669 B2 | 7/2007 | Cummings et al. |
| 7,274,975 B2 | 9/2007 | Miller |
| 7,460,553 B2 | 12/2008 | Insua et al. |
| 7,590,472 B2 | 9/2009 | Hakim et al. |
| 7,783,390 B2 | 8/2010 | Miller |
| 7,957,846 B2 | 6/2011 | Hakim et al. |
| 8,061,132 B2 | 11/2011 | Fong et al. |
| 8,065,874 B2 | 11/2011 | Fong et al. |
| 8,191,360 B2 | 6/2012 | Fong et al. |
| 8,191,361 B2 | 6/2012 | Fong et al. |
| 8,201,402 B2 | 6/2012 | Fong et al. |
| 8,215,105 B2 | 7/2012 | Fong et al. |
| 8,240,142 B2 | 8/2012 | Fong et al. |
| 8,387,374 B2 | 3/2013 | Fong et al. |
| 8,393,148 B2 | 3/2013 | Fong et al. |
| 8,428,785 B2 | 4/2013 | Boucher |
| 8,436,489 B2 | 5/2013 | Stahlkopf et al. |
| 8,450,884 B2 | 5/2013 | Stahlkopf et al. |
| 8,468,814 B2 | 6/2013 | Fong et al. |
| 8,482,152 B1 | 7/2013 | Stahlkopf et al. |
| 8,509,976 B2 | 8/2013 | Kempton |
| 8,516,809 B2 | 8/2013 | Fong et al. |
| 8,561,399 B2 | 10/2013 | Fong et al. |
| 8,639,392 B2 | 1/2014 | Chassin |
| 8,694,409 B2 | 4/2014 | Chassin et al. |
| 8,756,928 B2 | 6/2014 | Fong et al. |
| 8,769,943 B2 | 7/2014 | Fong et al. |
| 8,781,638 B2 | 7/2014 | Rouse |
| 8,788,415 B2 | 7/2014 | Chassin et al. |
| 8,844,277 B2 | 9/2014 | Fong et al. |
| 8,880,231 B2 | 11/2014 | Boucher et al. |
| 8,893,486 B2 | 11/2014 | Fong et al. |
| 8,893,487 B2 | 11/2014 | Fong et al. |
| 8,903,560 B2 | 12/2014 | Miller |
| 8,912,684 B2 | 12/2014 | Stahlkopf et al. |
| 8,919,112 B1 | 12/2014 | Fong et al. |
| 8,970,176 B2 | 3/2015 | Ballatine et al. |
| 9,026,473 B2 | 5/2015 | Chassin et al. |
| 9,043,038 B2 | 5/2015 | Kempton |
| 9,080,529 B1 | 7/2015 | Klughart |
| 9,087,359 B2 | 7/2015 | Chassin |
| 9,129,337 B2 | 9/2015 | Chassin et al. |
| 9,134,353 B2 | 9/2015 | Jia et al. |
| 9,300,141 B2 | 3/2016 | Marhoefer |
| 9,382,799 B2 | 7/2016 | Stahlkopf et al. |
| 9,466,034 B2 | 10/2016 | Viassolo et al. |
| 9,509,176 B2 | 11/2016 | Carter et al. |
| 9,611,868 B2 | 4/2017 | Kenway et al. |
| 9,692,234 B2 | 6/2017 | Mammoli et al. |
| 9,754,300 B2 | 9/2017 | Kempton et al. |
| 9,760,957 B2 | 9/2017 | Hug et al. |
| 9,774,401 B1 | 9/2017 | Borrill |
| 9,846,886 B2 | 12/2017 | Greene et al. |
| 9,849,364 B2 | 12/2017 | Tran |
| 9,863,581 B2 | 1/2018 | Santos et al. |
| 10,022,613 B2 | 7/2018 | Tran |
| 10,046,228 B2 | 8/2018 | Tran |
| 10,170,932 B2 | 1/2019 | Carter et al. |
| 2003/0208437 A1 | 11/2003 | Samuelson |
| 2004/0236659 A1 | 11/2004 | Cazalet |
| 2009/0048890 A1 | 2/2009 | Burgh |
| 2009/0063228 A1 | 3/2009 | Forbes |
| 2009/0168525 A1 | 7/2009 | Olbrich et al. |
| 2012/0263125 A1 | 10/2012 | Tejaswini et al. |
| 2012/0323637 A1 | 12/2012 | Cushing |
| 2013/0013121 A1 | 1/2013 | Corbin |
| 2013/0192216 A1 | 8/2013 | Berlin, Jr. et al. |
| 2014/0156095 A1 | 6/2014 | Rouse |
| 2014/0214222 A1 | 7/2014 | Rouse |
| 2014/0310243 A1 | 10/2014 | McGee |
| 2016/0094034 A1 | 3/2016 | Divan et al. |
| 2016/0190833 A1 | 6/2016 | Roumi et al. |
| 2016/0197519 A1 | 7/2016 | Carter et al. |
| 2016/0218505 A1 | 7/2016 | Krupadanam et al. |
| 2016/0254671 A1 | 9/2016 | Cutright et al. |
| 2016/0273529 A1 | 9/2016 | Stahlkopf |
| 2017/0085091 A1 | 3/2017 | Kamalasadan et al. |
| 2017/0230447 A1 | 8/2017 | Harsha et al. |
| 2017/0271912 A1 | 9/2017 | Bhowmik et al. |
| 2017/0300019 A1 | 10/2017 | Blackhall et al. |
| 2018/0078843 A1 | 3/2018 | Tran |
| 2018/0264347 A1 | 5/2018 | Tran |
| 2018/0162381 A1 | 6/2018 | Colavincenzo et al. |
| 2018/0219374 A1 | 8/2018 | Pavlak et al. |
| 2019/0019080 A1 | 1/2019 | Claessens et al. |
| 2019/0129368 A1 | 5/2019 | Iacovella et al. |
| 2020/0133220 A1 | 4/2020 | Anichkov et al. |
| 2022/0224129 A1* | 7/2022 | Liu ..................... H02J 7/00712 |

FOREIGN PATENT DOCUMENTS

| | | |
|---|---|---|
| KR | 1020180134633 A | 12/2018 |
| WO | 2001090996 A2 | 11/2001 |
| WO | 2001091013 A2 | 11/2001 |
| WO | 2010077830 A2 | 7/2010 |
| WO | 2012116340 A2 | 8/2012 |
| WO | 2017100137 A1 | 6/2017 |

OTHER PUBLICATIONS

Petrik et. al.:"Optimal threshold control for energy arbitrage with degradable battery storage", UAI'15 Proceedings of the Thirty-First Conference on Uncertainty in Artificial Intelligence, Digital Library, Jul. 12-16, 2015, pp. 692-701.

Ross et. al.: "Microgrid Economic Dispatch With Energy Storage Systems", IEEE Transactions on Smart Grid, Jul. 2018, vol. 9, Issue: 4, pp. 3039-3047.

* cited by examiner (Prior Art)
FIG. 1

BATTERY CHARGE AND DISCHARGE POWER CONTROL IN A POWER GRID

CROSS-REFERENCE TO RELATED APPLICATION

This application claims the benefit of U.S. Provisional Patent Application No. 62/799,111, filed on Jan. 31, 2019, and PCT Application No. PCT/US2020/016047 which was filed on Jan. 31, 2020, the contents of which are hereby incorporated by reference for all purposes.

BACKGROUND

This invention relates generally to controlling an energy storage system (ESS) in a power grid and, more specifically, to a power controller for optimizing the discharging and charging state of charge (SOC) of the ESS.

It is generally recognized that the installation and use of an ESS on an electrical grid can result in material benefits (operational, financial, environmental, etc.) to grid participants and/or stakeholders, and by doing so can generate material financial returns to an entity owning or controlling the energy storage (ES) assets. Energy storage techniques can generate these kinds of benefits through a range of potential ES applications, such as (i) the provision of certain ancillary services for which there are established energy or capacity market mechanisms, (ii) load shifting or peak shaving, (iii) deferral or avoidance of otherwise necessary transmission or distribution upgrades, (iv) relief of transmission or distribution bottlenecks or other constraints, (v) integration of intermittent renewable generation, whether through smoothing, ramping services, the provision of shaped power or otherwise, (vi) hybridization of generation assets to increase fuel efficiency or reduce carbon emissions, (vii) provision of backup power or uninterruptable power system (UPS) during islanded operation, (viii) time shifting of energy purchases and sales for cost saving or arbitrage purposes (see FIG. 1), (ix) provision (or committed availability to provide) various operating reserves, and (x) provision of power, energy or services that might otherwise be provided by a natural gas peaking plant or other power generation sources. The foregoing is intended to be a representative listing of ES applications, and not an exhaustive listing. In many cases a single ESS installed in a specific location can provide multiple ES applications. As used herein, references to a single ES application may include a combination or stacking of multiple ES applications that form an optimization package.

The existence and extent of the benefits and/or related financial returns from a specific installation and use of an ESS can be dependent on a broad range of factors. These factors include the cost of the ESS (which is generally measured in terms of $/kW and/or $/kWh), the ESS's ratio of power to energy, the size of the ESS (in kW or kWh), the round-trip efficiency of the ESS, the cycle life and/or useful life of the ESS and the power generation systems, the manner in which acquisition of the ESS is financed, the site and installation costs of the ESS, the ongoing operating and maintenance costs of the ESS. Additional factors can also relate to the location of the ESS installation and the ES application(s) for which it is used. These factors can include energy prices and other market conditions, the specific grid conditions giving rise to a need for the ES application, the pricing/compensation/tariffs or other incentives available for the product or service provided by the ES application, the reliability of forecasts of available power, and the mix of generation assets serving the geographic (or the collection of electrical connections to an ESS) area that includes the ESS.

A number of studies and simple models exist which each provide a degree of guidance regarding potential ES applications, the basic types of ESS technologies that may be appropriate for the ES applications, potential market sizes, and maximum ESS costs for the use of an ESS to be economical. These studies and models can be useful in providing overall insight into future markets and the appropriateness of current or future ES technologies to address certain needs or opportunities on the grid. The studies, however, do not provide specific insight as to the appropriate SOC operation specifications for an ESS used in conjunction with the ES application at such location. Moreover, third-party optimization packages that implement such models are costly and are not able to integrate with legacy digital tools of the entity owning or controlling the ES assets. This includes the inability to tune the third-party optimization package for specific requirements of the legacy digital tool. More specifically, third-party optimization packages do not couple an operating mode to the economic metrics that inform the optimal, appropriate energy and power characteristics of an ESS purchase.

In the absence of these insights, the existing studies and models are ineffective with respect to demonstrating whether installation and use of an appropriate ESS in a particular location to perform a particular ES application will, if operated in an appropriate manner, be attractive or even feasible from a financial perspective. Given that the existing studies and models are ineffective in this way they are not useful as a planning tool, much less as a stacked application to a legacy digital tool for grid participants, planners or regulators. In this sense there is a gap in the analytic digital tools available with respect to energy storage for the grid which are not being fulfilled by existing third-party optimization packages. Therefore, a system and a method that will address the foregoing issues is desirable.

BRIEF DESCRIPTION

In some embodiments, a power controller is added to efficiently manage a state of charge (SOC) operations of an energy storage system (ESS) on an electric grid.

BRIEF DESCRIPTION OF THE DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Figure 1:
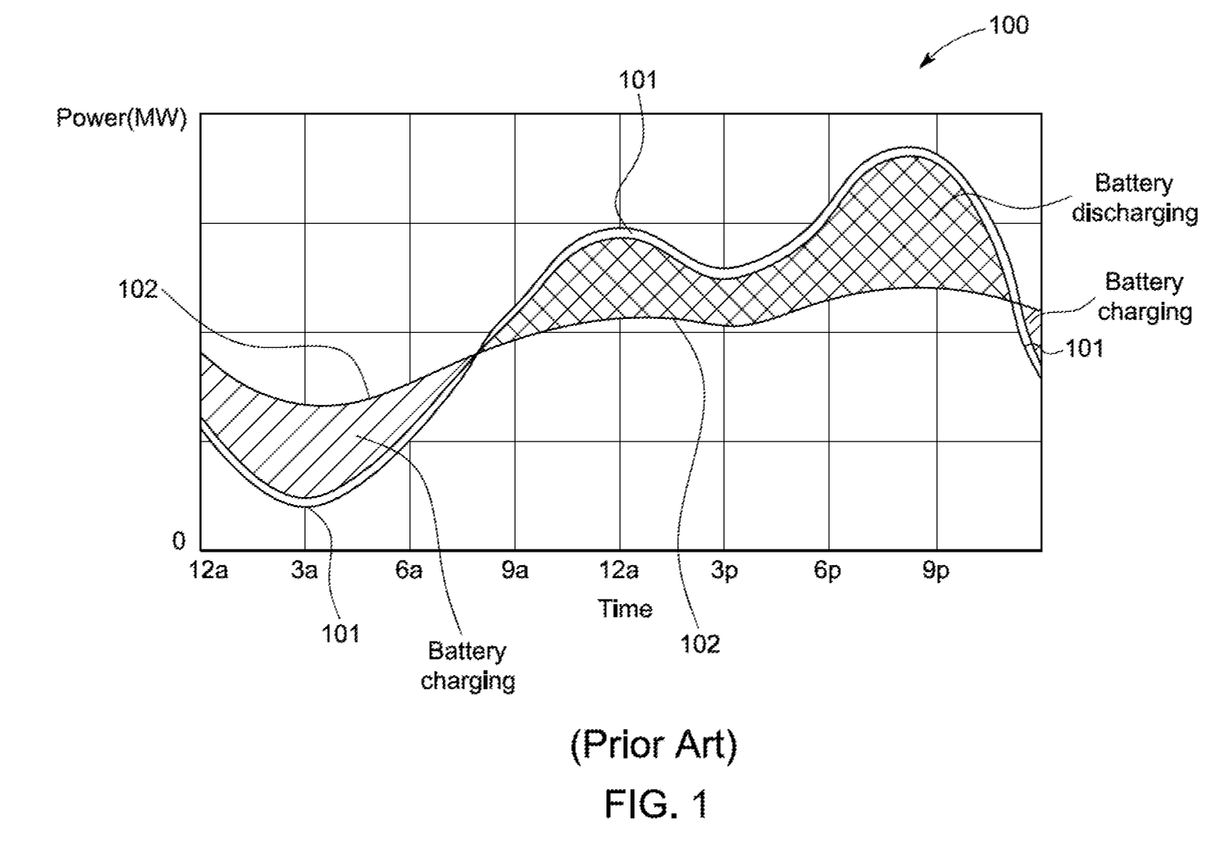
FIG. 1 depicts a graph representing an optimization of an energy storage system (ESS) by adjusting a charging and discharging state of charge (SOC) based on a load demand and power generation supply over a time window in accordance with an illustrative embodiment.

Referring now to FIG. 1, a graphical representation 100 of the optimized operation of an energy storage system (ESS) when factoring energy demand and supply over a time window is shown. Graph 100 includes a load curve 101 and a power generation supply curve 102. Load curve 101 is a graphical plot showing the variation in demand for energy (in MW) of the consumers on a supply source or sources of power generation (in MW) with respect to a time period of 24 hours. Power generation supply curve 102 is a graphical plot showing the variation in energy supplied by all types of generated power, which includes but is not limited to renewable power generation sources (e.g., photovoltaic (PV) panels and wind turbines) and thermal power generation sources (e.g., coal-fired, liquified natural gas (LNG)-fired, and oil-fired thermal power generation sources). Depending on the ratio between the load demand 101 and the power generation supply 102 there are times in which there is a potential energy gap (i.e., load demand larger than generated supply) or a potential energy surplus (i.e., generated supply is larger than the load demand). Large gaps typically occur at peak-demand times of the day and translate to higher values in energy cost supplied. Similarly, large surpluses typically occur at trough-demand times of the day and translate to lower values in energy cost supplied. As the costs of ESS's lower, it is sometimes economically feasible to incorporate ESS's in the electric grid to capitalize on those periods of energy gaps and surpluses, rather than ramping up and down the operation of dispatchable, non-renewable sources of power generation.

However, when calculating the feasibility of incorporating ESS's, it is important to consider the efficiencies of the system overall. This includes but is not limited to the efficiencies of the different types of batteries that are considered, the efficiency of electrical grid components such as inverters, transformers, and transmission line losses, the efficiencies of the power generation systems, and the overall degradation models for each of the ESS, the power generation system(s), and grid components. Moreover, the way the ESS is operated can affect its rate of degradation and ultimately its cost in its implementation over the course of a project's life. In this regard, some battery types degrade faster the longer they are maintained at their highest state of charge (SOC). Under such circumstances, it is beneficial to maintain the ESS at its highest SOC for the least amount of time possible, generally charging the ESS for the time needed such that the battery is discharged immediately upon reaching its highest SOC. Ideally, this discharging state would coincide with forecasted models indicating when such a discharging is in most need. For this reason, the ES power controller application described herein would serve to optimize the SOC of the ESS in view of various degradation models of the power grid elements and of external factors (e.g., forecasted weather changes, economic conditions) that would potentially alter the efficiency and costs of operating ESS's.

Figure 2:
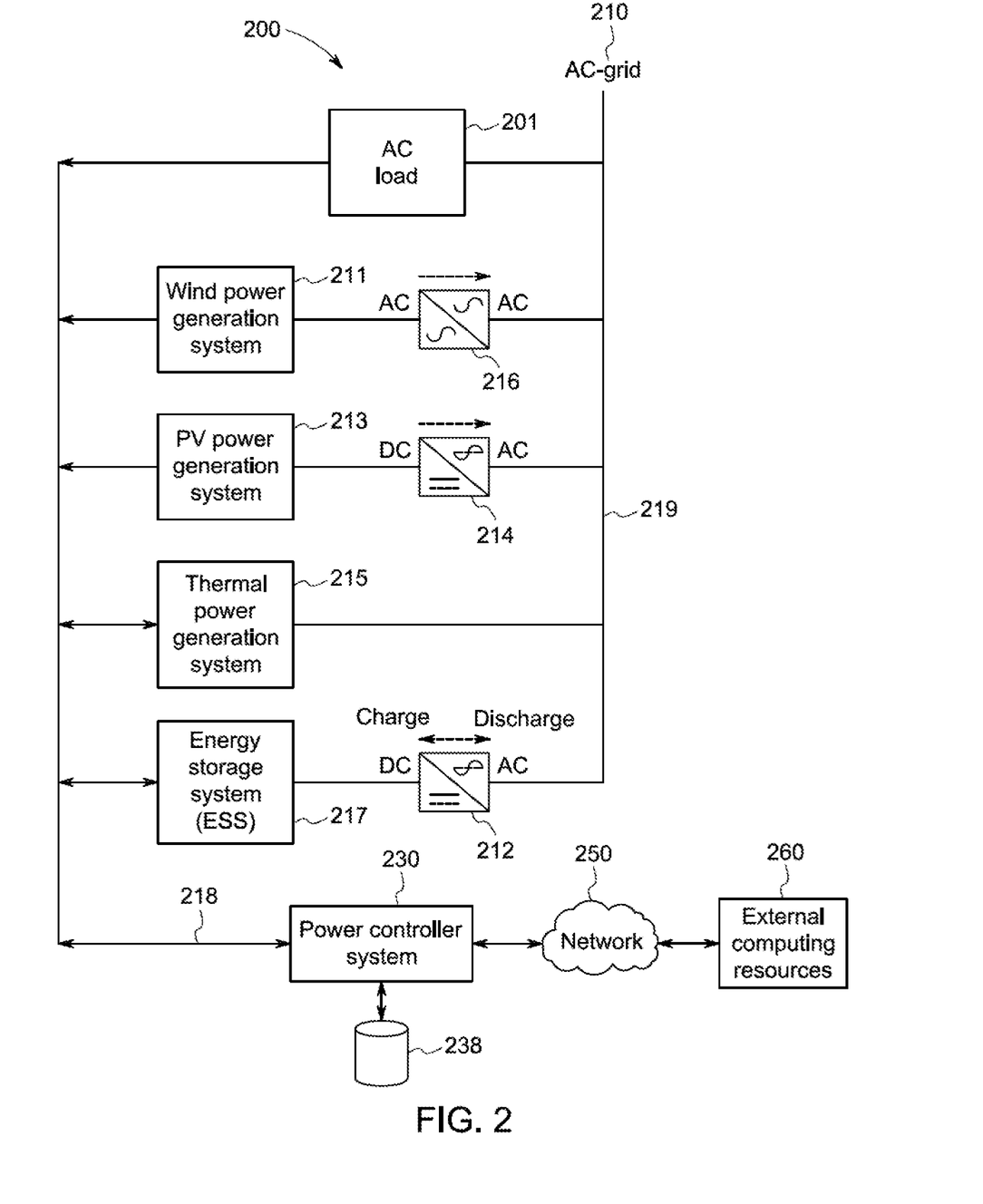
FIG. 2 depicts a schematic diagram representing an AC composite hybrid power grid system including an ESS and ES power controller in accordance with an illustrative embodiment.

With reference now to FIG. 2, an AC hybrid power grid system 200 is shown according to aspects of the present disclosure. The power grid system 200 includes an AC grid 210. The AC grid 210 uses power converters 212, 214, and 216 of AC/AC or DC/AC conversion structure. It should be appreciated that while the power grid system 200 has been presented in the current embodiment as transmitting AC power, other embodiments may include DC-only power grid or a combination of AC and DC grids.

The AC grid 210 includes a wind power generation system 211, photovoltaic (PV) power generation system 213, thermal power generation (TPG) system 215, and an energy storage (ES) system 217. Systems 211, 213, 215, and 217 are connected to each other and to an AC load 201 via an AC grid bus 219. AC load 201 and systems 211, 213, 215, and 217 are communicatively connected to power controller system 230 via AC control bus 218. Power controller system is also communicatively connected to historical database 238, as well as to external computing resources 260 via a network 250.

Turning to FIG. 3 and FIGS. 4A-D, additional detail of power controller system 230 and flow diagram 400 of examples of operation of the power controller system 230 according to some embodiments are provided. In particular, FIGS. 4A-D provides a flow diagram of a process 400, according to some embodiments. Process 400 and other processes described herein may be performed using any suitable combination of hardware (e.g., circuit(s), software or manual means. In one or more embodiments, the controller 230 is conditioned to perform the process 400 such that the system is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto.

Figure 3:
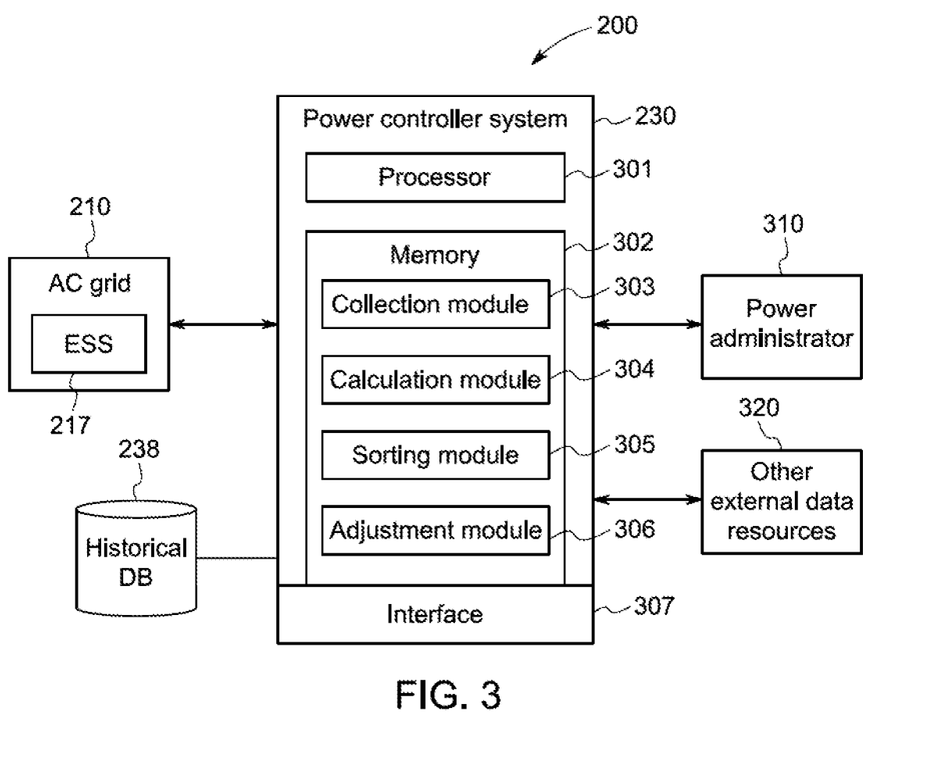
FIG. 3 depicts a more detailed view of the ES power controller shown in FIG. 2 in accordance with an illustrative embodiment.

In one or more embodiments, power controller system 230 includes a collection module 303, a calculation module 304, a sorting module 305, and an adjustment module 306. Collection module 303 serves to acquire historical, present, and forecast data via interface 307 from the various power generation systems 211, 213, 215, from ESS 217, from external data sources 320 and historical database 238, to acquire load data from AC load 201, as well as to acquire parameters (e.g., calculation cycle, time window, and project lifespan) for operation from power administrator 310. Calculation module 304 serves to determine a state of charge (SOC) of the ESS 217 in view of the data acquired by collection module 303. Sorting module 305 is responsible for sorting calculation cycles within a time window in various ways, such as by a ratio of load demand to power supply, and by temporal order. Adjustment module 306 is responsible for communicating an adjustment command to ESS 217 for setting the SOC at the designated calculation cycle. In one or more embodiments, the controller 230 includes one or more processor elements 301 and a memory 302. According to one or more embodiments, the processor 301 is a conventional microprocessor, and operates to control the overall functioning of modules 303-306. In one or more embodiments, the controller 230 includes a communication interface 307 for allowing the processor 301, and hence the modules 303-306, to engage in communication over data networks (not shown) with other devices (e.g., ESS 217, TPG devices 215, renewable power generation devices 211, 213, and load entities at AC load 201) or other off-grid external platforms, devices, and/or entities, such as 238, 310, 320.

In one or more embodiments, the one or more memory 302 and data storage devices (e.g., database 238) comprise any combination of one or more of a hard disk drive, RAM (random access memory), ROM (read only memory), flash memory, etc. The memory 302/data storage devices 238 store software that programs the processor 301 and the modules 303-306 to perform functionality as described herein. According to other embodiments, other types of storage devices include magnetic storage device, optical storage devices, mobile telephones, and/or semiconductor memory devices. The memory 302 stores a program or logic (not shown) for controlling the processor 301. The processor 301 performs instructions of the program logic, and thereby operates in accordance with any of the embodiments described herein. Furthermore, other embodiments include program logic that is stored in a compressed, uncompiled and/or encrypted format. The program logic includes other program elements, such as an OS (operating system), a database management system, and/or device drivers used by the processor 301 to interface with devices external to the controller 230.

According to one or more embodiments, a power administrator accesses the power grid system 200 via a computing device/platform (not shown; such as a control system, a desktop computer, a laptop computer, a personal digital assistant, a tablet, a smartphone, etc.) to view information and/or manage the operation of the ESS 217 in accordance with any of the embodiments described herein. Moreover, the embodiments described herein are implemented using any number of different hardware configurations. For example, controller 230, external data resources 320 and power administrator further include an input device (not shown) (e.g., a mouse and/or keyboard to enter information about the time and power measurements and settings) and an output device (not shown) (e.g., to output and display the data and/or recommendations).

Figure 4A:
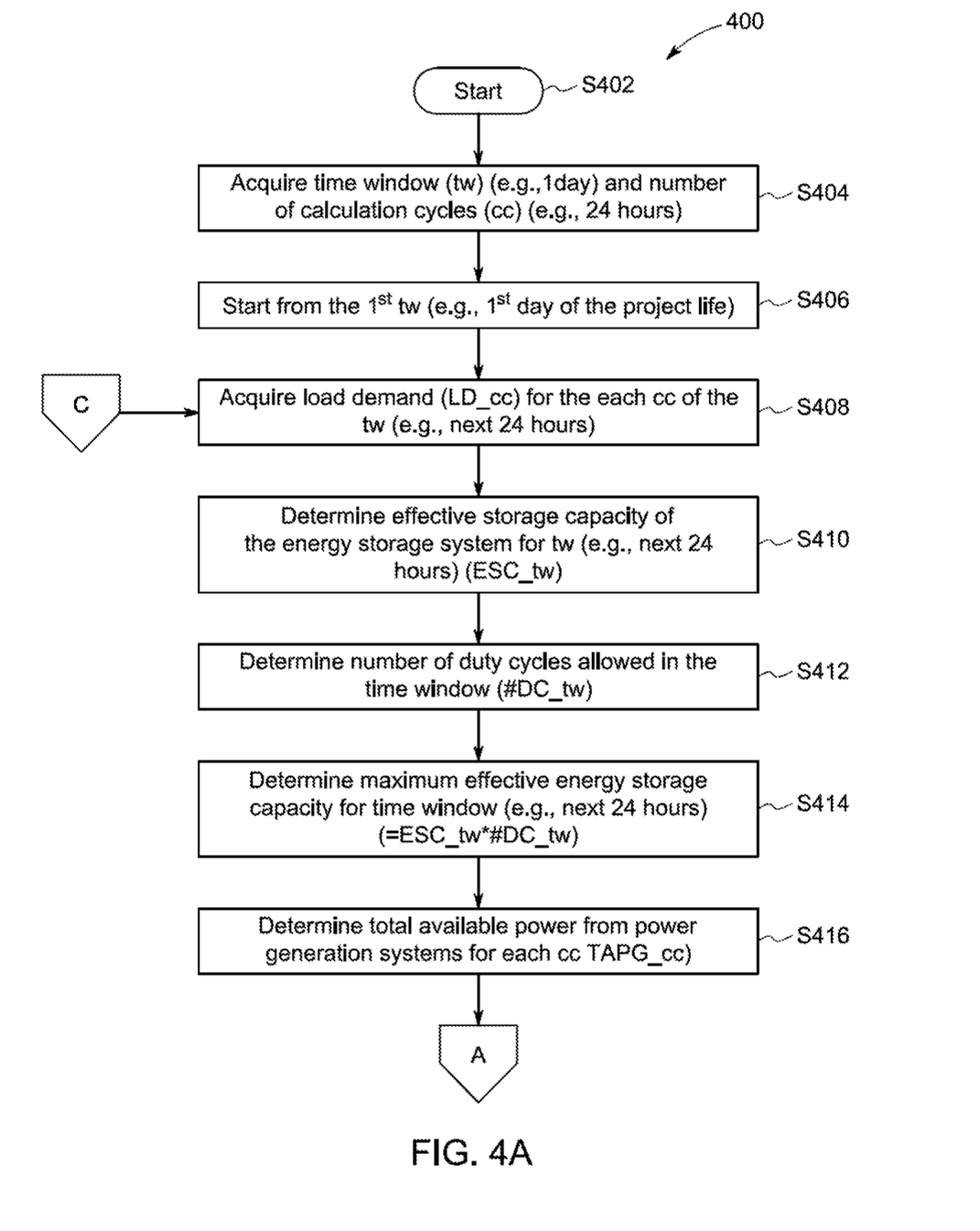
FIGS. 4A-4D each depict portions of a flowchart of a process for ES power control, in accordance with an illustrative embodiment.

Initially, the process 400 starts at S402 and proceeds to S404, in which power controller system 230 is configured with a project life having at least one time window having at least one calculation cycle during which to collect power generation supply data, load demand data, ES capacity data, ES charge/discharge power for determining a SOC for at least one ESS 217. According to one embodiment, the parameter values of the project life, time window, and calculation cycles are programmed by an administrator 310 of the power grid system 200 via an interface 307 with controller 230. According to other embodiments, ESS 217 includes a plurality of energy storage elements (not shown). In one or more embodiments, the ESS 217 is a battery (e.g., battery energy storage system (BESS), or any other suitable energy storage device. In one or more embodiments, ESS 217 is a device at a power plant, standalone ES devices, or any combination therein. ESS 217 provides energy to satisfy a power load demand from at least one of a grid, customers, etc.

Starting from a first, time window, e.g., the first day of a project life as shown in S406, the process continues to S408, where collection module 303 acquires a load demand of one or more power load 201 for each calculation cycle of a time window. In this example embodiment, since the process is beginning, the next time period consists of the first 24 hours. Subsequent iterations of this step would use the data pertaining to the subsequent 24-hour time window. In one embodiment, the load demand is acquired from historical load demand data in historical database 238, predicted load demand data based on future load demands of AC Load 201 acquired by collection module 303, and any combination therein. It should be noted that while the example hybrid power grid system 200 includes only AC loads, it should be appreciated that in other embodiments, load demand data is drawn from either a DC load or combination of AC and DC loads.

The process continues to S410, in which collection module 303 determines an effective ES capacity of the ESS 217 for the time window. According to one or more embodiments, the effective ES capacity is based on a degradation model of the ESS 217. Next, at S412, collection module 303 determines a number of allowed duty cycles of the ESS 217 for the time window. From S412, the process continues to S414, where calculation module 304 determines a product of the effective ES capacity of the ESS 217 for the time window and the number of allowed duty cycles of the ESS 217 for the time window. The process proceeds to S416, where calculation module 304 determines a total available power from power generation systems 211, 213, 215 at each of the calculation cycles of the present time window. According to one or more embodiments, the total available power is based on a degradation model of the power generation systems 211, 213, 215. Moreover, one or more embodiments draw the total available power calculation from other factors such as: the historical renewable or dispatchable power source generation data for the time window being calculated that is stored in historical database 238, predicted renewable power source generation data for the time window being calculated (e.g., weather forecast data for renewable power generation system's location) that is acquired by collection module 303, or any combination thereof.

Figure 4B:
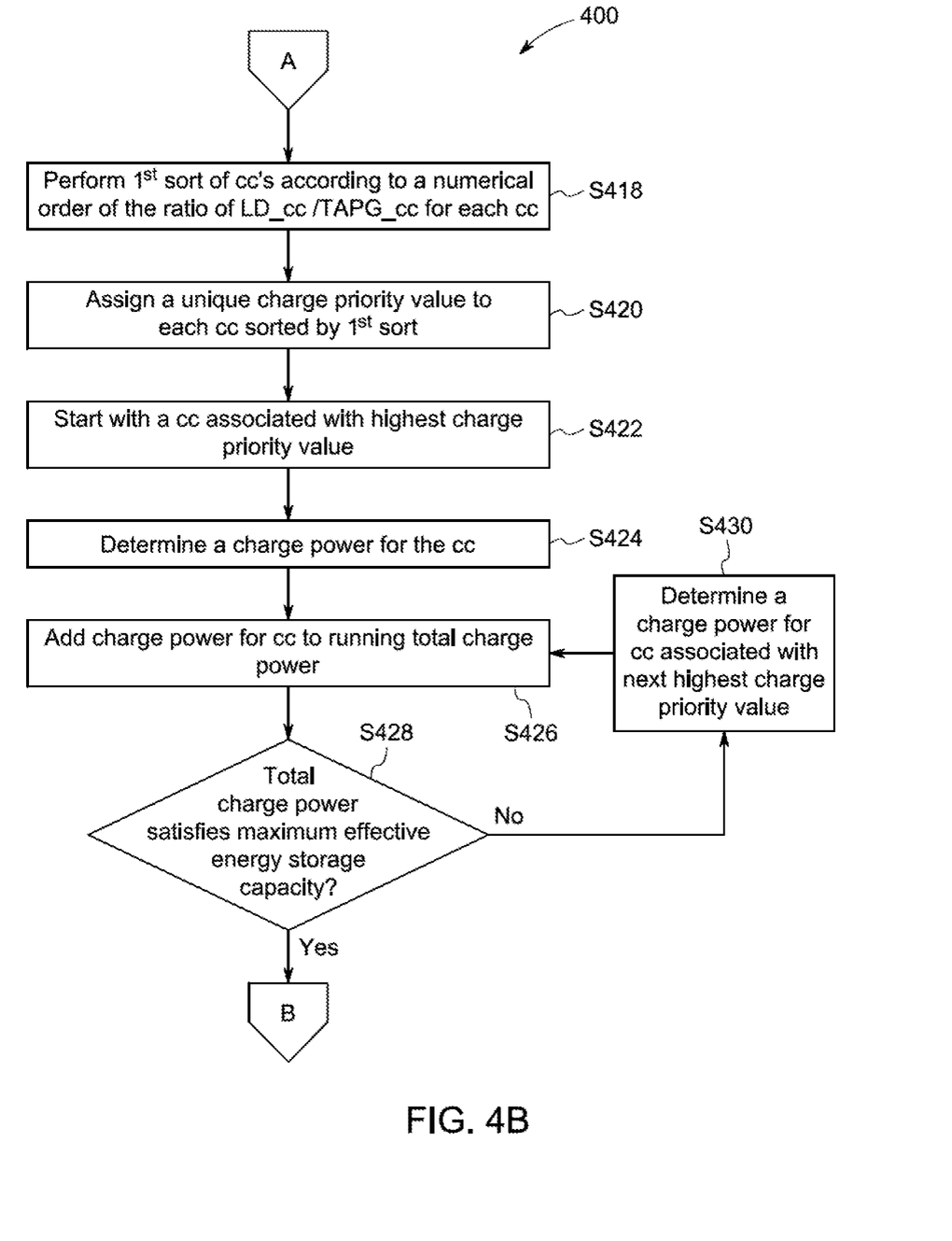

Process 400 continues to off-page connector "A" to the next portion of the flowchart shown in FIG. 4B starting at S418. At S418, sorting module 305 performs a first sort of the calculation cycles in the present time window by sorting in numerical order according to a ratio of the load demand of the power load 201 to the total available power from power generation systems 211, 213, 215 for each calculation cycle. In this regard, the ratio is directly proportional to an energy cost value at the calculation cycle. Following at S420, calculation module 304 assigns a unique, charge priority value to each of the calculation cycles (i.e., sorted according to the first sort above) associated with their respective ratio values.

Starting with a calculation cycle that is associated with a highest charge priority value (i.e., lowest discharge priority value) as shown in S422, the process continues to S424, where calculation module 304 determines a charge power for the present calculation cycle. Calculation module 304 adds at S426 the determined charge power to a running total charge power (if any; since it is the first iteration there are no previously calculated charge power values to add). The process continues to decision block S428, where calculation module 304 determines whether the total charge power satisfies the maximum effective ES capacity (determined from S414). If the decision at S428 is "No", the process proceeds to S430 where calculation module 304 determines a charge power for the calculation cycle associated with the next highest charge priority value and the process iteratively returns to S426. However, if the decision at S428 is "Yes", the process 400 continues to off-page connector "B" to the next portion of the flowchart shown in FIG. 4C starting at S432.

Figure 4C:
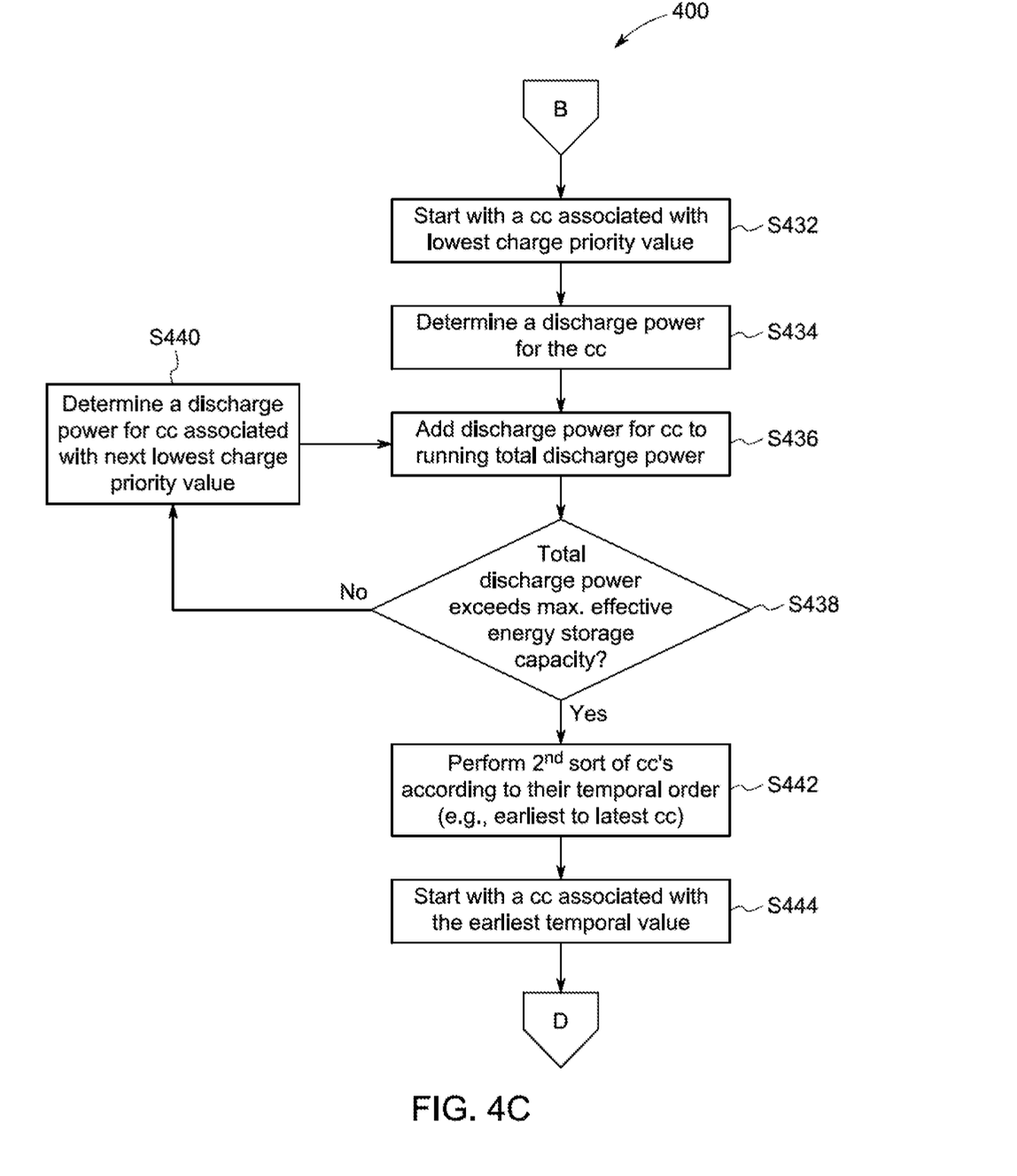
Figure 4D:
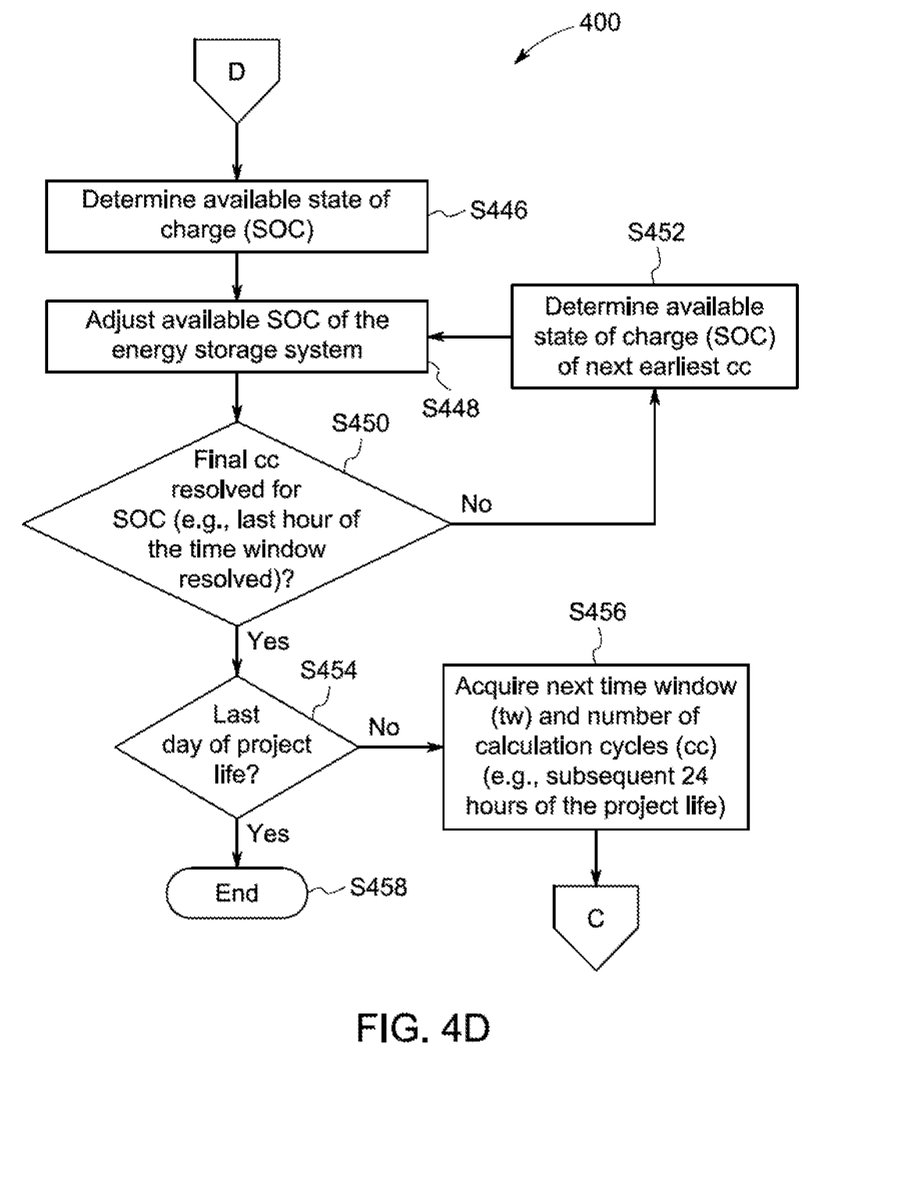

Starting with a calculation cycle that is associated with a lowest charge priority level (i.e., highest discharge priority value) as shown in S432, the process continues to S434, where calculation module 304 determines a discharge power for the present calculation cycle. Calculation module 304 adds at S436 the determined discharge power to a running total discharge power (if any; since it is the first iteration there are no previously calculated discharge power values to add). The process continues to decision block S438, where calculation module 304 determines whether the total discharge power exceeds the maximum effective ES capacity (determined from S414). If the decision at S438 is "No", the process proceeds to S440 where calculation module 304 determines a discharge power for the calculation cycle associated with the next lowest charge priority value and the process iteratively returns to S436. However, if the decision at S438 is "Yes", the process 400 continues to S442.

At S442, sorting module 305 performs a second of calculation cycles in the present time window by sorting them according to their temporal order (e.g., earliest to latest calculation cycle). Starting with the calculation cycle associated with the earliest temporal value (S444), the process 400 continues to off-page connector "D" to the next portion of the flowchart shown in FIG. 4D starting at S446, in which calculation module 304 determines an available state of charge (SOC) of the ESS 217. Continuing to S448, adjustment module 306 adjusts the SOC value of ESS 217 to reflect the available SOC value determined in S446. In this regard, charging and discharging constraints are imposed upon adjustment module 306 such that the SOC of ESS 217 cannot be adjusted to a negative value (i.e., an over-drain condition) or adjusted to exceed the charge capacity of ESS 217 (i.e., an over-charge condition). According to one or more embodiments, further constraints are imposed, including but not limited to energy balance and equipment nameplate restrictions. In one example embodiment, ESS 217 is assigned a maximum SOC such that ESS 217 has available charge capacity in the event of a regulation down service. The process continues to decision block S450, in which calculation module 304 determines whether all the calculation cycles of the time window have been resolved with respect to adjusting each of their SOC values. If there are still unresolved calculation cycle(s) left, the process proceeds to S452, where calculation module 304 determines the available SOC of the next earliest calculation cycle and the process iteratively returns to S448. However, if all calculation cycles have been resolved for the SOC values of the ESS 217, the process continues to decision block S454, where calculation module 304 determines whether the analysis has been resolved for the last day of the project's life. If the answer to S454 is "No", the process continues to S456 where collection module 303 acquires the next time window and number of calculation cycles (e.g., the subsequent 24 hours of the project's life) and the process 400 iteratively returns to S408 of FIG. 4A via off-page connector "C". If the S454 results in "Yes", the process ends at S458.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a geometrical compensation module. The method steps can then be carried out using the distinct software modules and/or sub-modules of the system, as described above, executing on one or more hardware processors 301 (FIG. 3). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

What is claimed is:

1. A power controller system for controlling an energy storage device comprising:
   a memory for storing program instructions; and
   a power controller processor, the power controller processor is coupled to the memory and the power controller processor is in communication with at least one power generation system, at least one energy storage system, and at least one power load, the power controller processor is operative to execute program instructions to:
   acquire time parameters, including a time window having at least one calculation cycle;
   determine a maximum effective energy storage capacity of the at least one energy storage system for the time window;
   perform a first sort of the at least one calculation cycle of the time window by sorting in a numerical order according to a ratio of a load demand of the at least one power load to a total available power from the at least one power generation system at each of the at least one calculation cycle;
assign a unique, charge priority value to each of the at least one calculation cycles sorted by the first sort;
determine, responsive to the first sort and starting from a highest charge priority value, a charge power for each calculation cycle until a total charge power satisfies the maximum effective energy storage capacity;
determine, responsive to the first sort and starting from a lowest sorted charge priority value, an available discharge power for the each calculation cycle until a total discharge power exceeds the maximum effective energy storage capacity;
perform, responsive to the total charge power satisfying the maximum effective energy storage capacity and responsive to the total discharge power exceeding the maximum effective energy storage capacity, a second sort in a temporal order of the at least one calculation cycle;
determine, starting from an earliest calculation cycle of the second sort, an available state-of-charge (SOC) of the at least one energy storage system; and
adjust the SOC of the at least one energy storage system for the each calculation cycle organized by the second sort.

2. The power controller system of claim 1, wherein the determine a maximum effective energy storage capacity of the at least one energy storage system for the time window further comprising program instructions to:
determine an effective energy storage capacity of the at least one energy storage system for the time window;
determine a number of allowed duty cycles of the at least one energy storage system for the time window;
calculate a product of the effective energy storage capacity of the at least one energy storage system for the time window and the number of allowed duty cycles of the at least one energy storage system for the time window.

3. The power controller system of claim 2, wherein the determine the effective energy storage capacity of the at least one energy storage system for the time window is based on a degradation of the at least one energy storage system.

4. The power controller system of claim 1, wherein the total available power from the at least one power generation system at each of the at least one calculation cycle is based on a degradation of the at least one power generation system.

5. The power controller system of claim 1, wherein the charge power is a minimum value selected from: an available power from the at least one power generation system at the each calculation cycle and a power rating of the at least one energy storage system at the each calculation cycle.

6. The power controller system of claim 1, wherein the available discharge power is a minimum value selected from: a power rating of the at least one energy storage system at the each calculation cycle, an available charge of the at least one energy storage system at the each calculation cycle, and an available power output capacity of the at least one energy storage system at the each calculation cycle.

7. The power controller system of claim 1, wherein the ratio of the load demand of the at least one power load to the total available power from the at least one power generation system at each of the at least one calculation cycle is directly proportional to an energy cost value at the at least one calculation cycle.

8. A method comprising:
acquiring time parameters, including a time window having at least one calculation cycle;
determining a maximum effective energy storage capacity of the at least one energy storage system for the time window;
performing a first sort of the at least one calculation cycle of the time window by sorting in a numerical order according to a ratio of a load demand of at least one power load to a total available power from at least one power generation system at each of the at least one calculation cycle;
assigning a unique, charge priority value to each of the at least one calculation cycles sorted by the first sort;
determining, responsive to the first sort and starting from a highest charge priority value, a charge power for each calculation cycle until a total charge power satisfies the maximum effective energy storage capacity;
determining, responsive to the first sort and starting from a lowest sorted charge priority value, an available discharge power for the each calculation cycle until a total discharge power exceeds the maximum effective energy storage capacity;
performing, responsive to the total charge power satisfying the maximum effective energy storage capacity and responsive to the total discharge power exceeding the maximum effective energy storage capacity, a second sort in a temporal order of the at least one calculation cycle;
determining, starting from an earliest calculation cycle of the second sort, an available state-of-charge (SOC) of the at least one energy storage system; and
adjusting the SOC of the at least one energy storage system for the each calculation cycle organized by the second sort.

9. The method of claim 8, wherein the determining a maximum effective energy storage capacity of the at least one energy storage system for the time window further comprising:
determining an effective energy storage capacity of the at least one energy storage system for the time window;
determining a number of allowed duty cycles of the at least one energy storage system for the time window;
calculating a product of the effective energy storage capacity of the at least one energy storage system for the time window and the number of allowed duty cycles of the at least one energy storage system for the time window.

10. The method of claim 9, wherein the determining the effective energy storage capacity of the at least one energy storage system for the time window is based on a degradation of the at least one energy storage system.

11. The method of claim 8, wherein the total available power from the at least one power generation system at each of the at least one calculation cycle is based on a degradation of the at least one power generation system.

12. The method of claim 8, wherein the charge power is a minimum value selected from: an available power from the at least one power generation system at the each calculation cycle and a power rating of the at least one energy storage system at the each calculation cycle.

13. The method of claim 8, wherein the available discharge power is a minimum value selected from: a power rating of the at least one energy storage system at the each calculation cycle, an available charge power of the at least one energy storage system at the each calculation cycle, and an available power output capacity of the at least one energy storage system at the each calculation cycle.

14. The method of claim 8, wherein the ratio of the load demand of the at least one power load to the total available power from the at least one power generation system at each of the at least one calculation cycle is directly proportional to an energy cost value at the at least one calculation cycle.

15. A non-transitory computer-readable medium storing instructions that, when executed by a computer processor, cause the computer processor to perform a method comprising:
   acquiring time parameters, including a time window having at least one calculation cycle;
   determining a maximum effective energy storage capacity of the at least one energy storage system for the time window;
   performing a first sort of the at least one calculation cycle of the time window by sorting in a numerical order according to a ratio of a load demand of at least one power load to a total available power from at least one power generation system at each of the at least one calculation cycle;
   assigning a unique, charge priority value to each of the at least one calculation cycles sorted by the first sort;
   determining, responsive to the first sort and starting from a highest charge priority value, a charge power for each calculation cycle until a total charge power satisfies the maximum effective energy storage capacity;
   determining, responsive to the first sort and starting from a lowest sorted charge priority value, an available discharge power for the each calculation cycle until a total discharge power exceeds the maximum effective energy storage capacity;
   performing, responsive to the total charge power satisfying the maximum effective energy storage capacity and responsive to the total discharge power exceeding the maximum effective energy storage capacity, a second sort in a temporal order of the at least one calculation cycle;
   determining, starting from an earliest calculation cycle of the second sort, an available state-of-charge (SOC) of the at least one energy storage system; and
   adjusting the SOC of the at least one energy storage system for the each calculation cycle organized by the second sort.

16. The medium of claim 15, wherein the determining a maximum effective energy storage capacity of the at least one energy storage system for the time window further comprising:
   determining an effective energy storage capacity of the at least one energy storage system for the time window;
   determining a number of allowed duty cycles of the at least one energy storage system for the time window;
   calculating a product of the effective energy storage capacity of the at least one energy storage system for the time window and the number of allowed duty cycles of the at least one energy storage system for the time window.

17. The medium of claim 16, wherein the determining the effective energy storage capacity of the at least one energy storage system for the time window is based on a degradation of the at least one energy storage system.

18. The medium of claim 15, wherein the total available power from the at least one power generation system at each of the at least one calculation cycle is based on a degradation of the at least one power generation system.

19. The method of claim 15, wherein the charge power is a minimum value selected from: an available power from the at least one power generation system at the each calculation cycle and a power rating of the at least one energy storage system at the each calculation cycle.

20. The method of claim 15, wherein the available discharge power is a minimum value selected from: a power rating of the at least one energy storage system at the each calculation cycle, an available charge of the at least one energy storage system at the each calculation cycle, and an available power output capacity of the at least one energy storage system at the each calculation cycle.

* * * * *